United States Patent [19]
Stell et al.

[11] Patent Number: 6,079,272
[45] Date of Patent: Jun. 27, 2000

[54] GYROSCOPES AND COMPENSATION

[75] Inventors: Christopher B. Stell, Valencia; Vatche Vorperian, Irvine; Roman C. Gutierrez; Tony K. Tang, both of Glendale, all of Calif.

[73] Assignee: California Institute of Technology, Pasadena, Calif.

[21] Appl. No.: 09/130,696

[22] Filed: Aug. 7, 1998

Related U.S. Application Data

[60] Provisional application No. 60/055,548, Aug. 13, 1997.

[51] Int. Cl.$^7$ ........................................................ G01P 9/04

[52] U.S. Cl. ............................................................ 73/504.12

[58] Field of Search .......................... 73/504.12, 504.14, 73/504.15, 504.16, 504.04

[56] References Cited

U.S. PATENT DOCUMENTS

| | | | |
|---|---|---|---|
| 4,884,446 | 12/1989 | Ljung | 73/504.12 |
| 5,197,331 | 3/1993 | Oikawa | 73/504.12 |
| 5,226,321 | 7/1993 | Varnham et al. | 73/504.13 |
| 5,600,063 | 2/1997 | Ogawa | 73/504.12 |
| 5,712,426 | 1/1998 | Sapuppo et al. | 73/504.02 |
| 5,894,090 | 4/1999 | Tang et al. | 73/504.12 |

*Primary Examiner*—John E. Chapman
*Attorney, Agent, or Firm*—Fish & Richardson P.C.

[57] ABSTRACT

A gyroscope system can detect the amount of movement of the system. The gyroscope system includes a circuit that has a number of different features and detects movement independent of any circuit parameters. The first feature uses a feedback loop to compensate for difference in Q factors between the circuits. Another feature regulates the amplitude of the resonator. Yet another feature extracts the rotation rate signals from the gyroscope in a new way.

7 Claims, 2 Drawing Sheets

GYROSCOPES AND COMPENSATION

CROSS REFERENCE TO RELATED APPLICATIONS

This application claims the benefit of the U.S. Provisional Application Ser. No. 60/055,548, filed on Aug. 13, 1997, which is incorporated herein by reference.

STATEMENT AS TO FEDERALLY SPONSORED RESEARCH

The invention described herein was made in the performance of work under a NASA contract, and is subject to the provisions of Public Law 96-517 (35 U.S.C. 202) in which the Contractor has elected to retain title.

BACKGROUND

Gyroscopes determine rotation rate signals. An amount by which the external stimulus affects the gyroscope's motion is sensed, thereby detecting the amount of the motion. An associated circuit senses the gyroscope's motion, and produces output signals indicative thereof.

Gyroscopes are conventionally used for detecting rotational angular velocity in different systems, including automobiles, inertial navigation in aircraft and ships, robots, television cameras, and any other device which requires detection of angular velocity. A vibratory gyroscope has a vibrator portion that is rotated about a Z axis while bending vibrations (the vibration to be sensed) occur in the x axis direction. Coriolis forces then act on the vibrator to vibrationally deform the vibrator in the y axis direction. The amount of deformation in the y axis is then detected as a voltage signal. Hence, in a vibratory gyroscope, the Coriolis force of the x axial direction motion causes deformation in the y direction. The Coriolis force is proportional to the angular velocity of the device. This allows detection of the angular velocity $\omega$ in the Z axis direction.

Other ways of detecting multi-axis operation are known; however, the features of this embodiment can be simply described with respect to single axis operation.

Gyroscope motion detecting circuits can operate using a resonant detection circuit to detect some aspect of the motion of the gyroscope. The resonant detection is dependent on the quality factor or "Q" of the resonant part.

It is desireable to detect the amount of movement of the circuit, independent of any parameter of the circuit, including its Q factor.

SUMMARY

The present disclosure describes a system which avoids these problems by using a circuit which has a number of different features. The first feature uses a feedback loop to compensate for difference in Q factors between the circuits. Another feature regulates the amplitude of the resonator. Yet another feature extracts the rotation rate signals from the gyroscope in a new way.

BRIEF DESCRIPTION OF THE DRAWINGS

These and other aspects of the invention will now be described with reference to the attached drawings, in which.

DESCRIPTION OF THE EMBODIMENT

Figure 1:
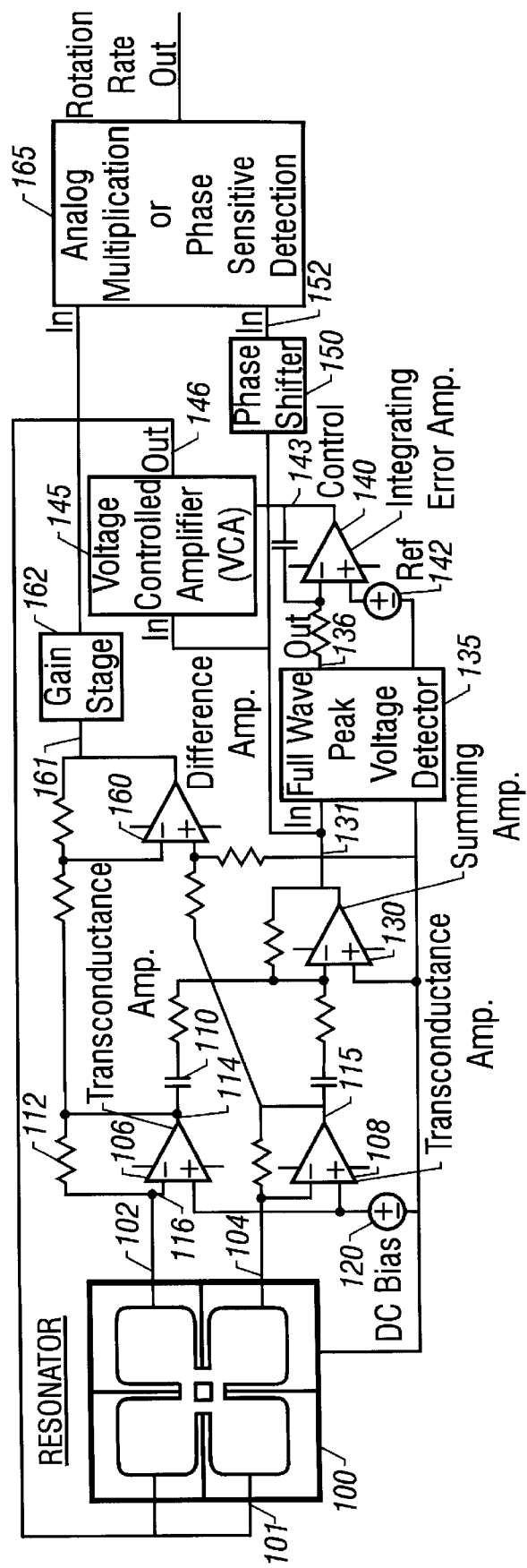
FIG. 1 shows a schematic of the basic structure of the circuit for monitoring the resonator.

The basic circuit is shown in FIG. 1. A resonator 100 is preferably of the type known as a cloverleaf vibratory gyroscope and described in U.S. Pat. No. 5,894,090, issued on Apr. 13, 1999. The device is in the shape of a clover leaf, as generally shown in FIG. 1. The overall size is between 1 and 3.6 mm square, preferably the latter. The drive is electrostatic, and the device is driven to mechanical resonance points to minimize the amount of drive and hence the amount of stray charge.

Figure 2:
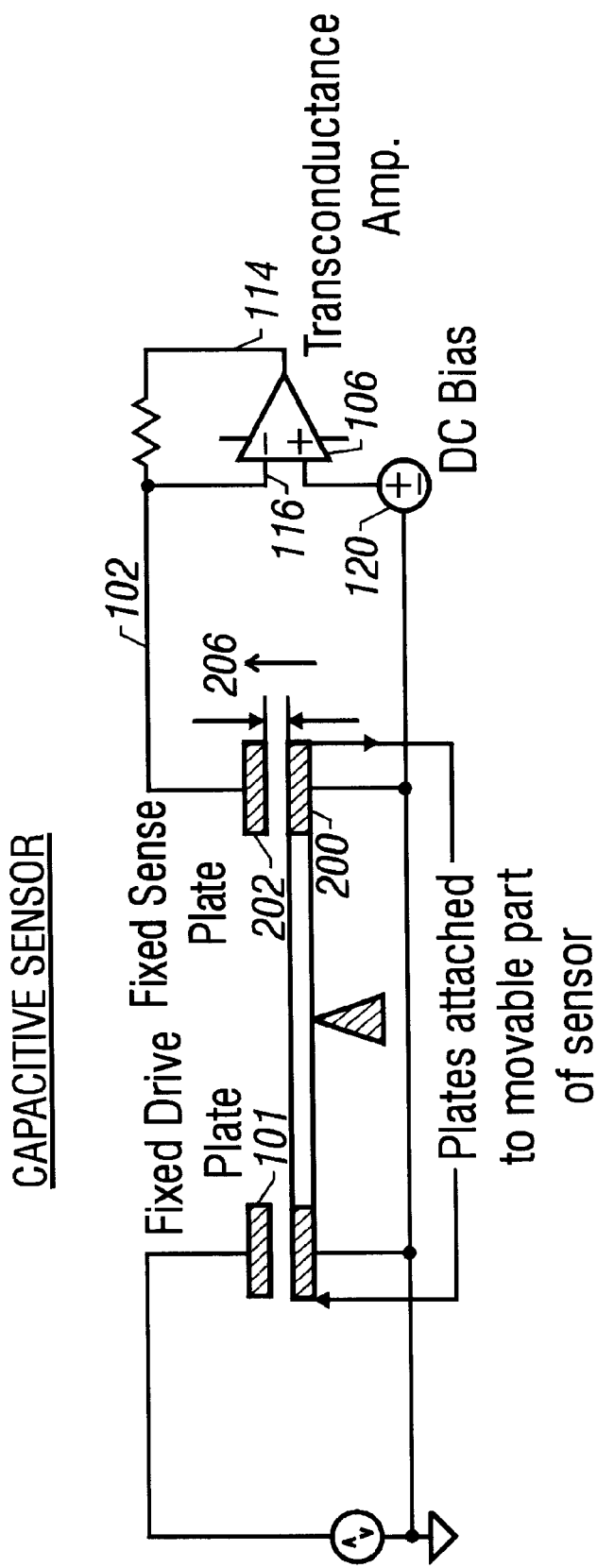
FIG. 2 shows a cross sectional type view of the resonator and the circuit.

The cloverleaf structure 100 is formed of a number of cloverleaf-shaped elements. FIG. 2 shows that a capacitor is formed between a movable part 200 and a fixed part 202. The capacitance changes as the structure moves. Hence, the outputs 102, 104 vary in capacitance according to the drive and Coriolis forces.

The outputs 102, 104 are provided to respective inputs of transconductance amplifiers 106, 108. The output 102 drives the negative input of transconductance amplifier 106. Similarly, the output 104 drives the negative input of transconductance amplifier 108. As well known, a transconductance amplifier is a device whose output current depends on the input voltage. Like an operational amplifier, the transconductance amplifier will produce an output of an amount which will equalize the positive (+) and negative (−) inputs to the transconductance amplifier. Each of the transconductance amplifiers has an output capacitor 110 to block DC (steady state), and a feedback resistor 112 connected between its output node 114 and its negative input node 116.

A DC bias element 120 provides a constant DC bias to the positive (+) terminals of the transconductance amplifiers 106, 108. The output of the transconductance amplifier changes in a way to equalize the inputs. Hence, the amplifier output changes in a way that causes the negative input to ramp up to the DC bias potential.

The resonator 100 is driven to move as described herein. This causes the movable sense plate 200 to move, which causes the capacitance across the sensing capacitor plates 200, 202 to change. The voltage across the sense capacitor, however, is held constant by the transconductance amplifier 106. With the plate voltage held constant, the plate movement causes a variation in plate charge. The varying plate charge changes the current flow into the transconductance amplifier's input node 116. This, in turn, changes the output current and hence the voltage. The amplifier output 114 is proportional to the velocity of the sensing plate. Since charge differencing is used without appreciably changing the voltage, the noise factor can be improved.

The outputs from the two transconductance amplifiers 106, 108 are connected to a summing amplifier 130. The summing amplifier can also be a transconductance amplifier, or an operational amplifier. The summing amplifier 130 sums the two voltages applied thereto and provides the output to a peak detector circuit 135. Peak detector circuit 135 can be, for example, an operational amplifier performing a full wave rectification of the velocity signals. The peak-detected output 136 is provided to an integrating error amplifier 140 which produces an error signal representing the integral of a difference between the peak detector signal output 136 and the voltage reference produced from reference 142.

The error signal forms a control signal 143 which controls the gain of a voltage controlled amplifier 145 whose input is also fed by the output of the summing amplifier. The output 146 of the voltage-controlled amplifier 145 is fed back as the velocity commanding signal to the drive plate 101 of the resonator 100.

A higher error signal commands more oscillation of resonator 100. The system reaches equilibrium when the gain of the voltage-controlled amplifier 145 converges at the precise gain that is required to achieve the desired amplitude set according to the reference 142. Hence, the amplitude of the movement is controlled in a constant, fed-back manner. The actual characteristics of the elements of the circuit are compensated by the feedback loop.

Outputs 114 and 115 of the respective transconductance amplifiers represents the motion of the gyro along its sensing direction shown as 206 in FIG. 2. This signal includes rotation information that is being measured by the gyroscope. Hence, the summed signal 131 includes part of the information that is going to be measured.

The rotation information is sensed by phase-shifting the waveform at the output of the summing amplifier. Phase shifter 150 produces a phase shifted signal 152 as one part of the information to be sensed.

The rest of the measured information is included in the difference between the outputs 102 and 104. This difference 161 is detected by a difference amplifier 160, amplified by gain stage 162 and forms the second part of the information to be sensed. An analog multiplier 165 performs phase sensitive detection by multiplying the components. The rotation rate is determined by the difference between the two output signals multiplied by the phase-shifted signal.

The Coriolis signal produced by the resonator oscillation is approximately 90 degrees out of phase with the drive signal. Hence, the average voltage of the multiplier output is linearly proportional to Coriolis-induced rotation rate.

An important feature of this circuit is the ability to produce an accurate output independent of component values, e.g., the quality or Q factor of the resonator. This can also include stray capacitance, inductance, and wiring values.

As the Q of the resonator changes, the response of the resonator 100 to the drive input 101 will also change. However, the feedback system of the present disclosure compensates for any difference in Q of the resonator by adjusting the gain of VCA 145 based on the output of the resonator. The drive circuit increases or decreases the drive voltage amplitude in order to maintain a constant resonator amplitude output as described above. The drive voltage amplitude is therefore proportional to the Q of the resonator. The slew factor, in contrast, is inversely proportional to the Q factor of the resonator.

The amplified difference signal is multiplied by the 900 phase shifted drive signal. This nullifies the effective slew factor variation due to the resonator variations. The phase shifter circuit produces a signal that is proportional to drive voltage and phase shifted by 90°. Hence, this circuit, unlike prior circuits, uses both the amplitude of the drive voltage and its phase information. A phase locked loop is preferably not used, since a phase locked loop would lose this amplitude information.

As described above, this system uses a dual feedback loop system. The first feedback loop sets the gain of the voltage-controlled amplifier to determine the resonant amplitude of the resonator 100.

Although only a few embodiments have been described in detail above, other embodiments are contemplated by the inventor and are intended to be encompassed within the following claims. In addition, other modifications are contemplated and are also intended to be covered.

What is claimed is:

1. A gyroscope circuit, comprising:
   a resonator having a variable capacitor;
   an outputting element configured to drive said resonator;
   a receiving element configured to receive a signal from the resonator indicative of a movement to be detected;
   a reference; and
   a feedback loop that establishes an amount of drive to the resonator based on the signal from the resonator and said reference, said feedback loop including an element operating to hold a voltage on the capacitor constant, such that a charge on the capacitor varies when its capacitance is varied.

2. A circuit as in claim 1, wherein said feedback loop comprises a first circuit that establishes a peak output indicative of a peak received value on said input, a first amplifier, and a second amplifier, said first amplifier producing a control signal used to control the gain of said second amplifier, such that said second amplifier produces a driving output indicative of a difference between said peak output and said reference, said driving output used for driving said resonator, to thereby produce a larger output from said resonator to thereby increase said input and hence said peak received value and thereby reduce said difference.

3. A circuit as in claim 1, wherein said element in said feedback loop causes a charge on said variable capacitor to vary based on said movement to be detected.

4. A circuit as in claim 2, further comprising a element for providing an output signal indicative of rotation rate and which is based on both amplitude and phase of a signal from said resonator.

5. A gyroscope circuit, which operates based on an output from a gyroscope element, comprising:
   a gyroscope element, including a variable capacitor, which produces an output indicative of movement to be measured; and
   a sensing circuit that produces an output indicative of the movement based on both amplitude and phase detected from the gyroscope element, said sensing circuit configured to hold a voltage on the capacitor constant, such that a charge on the capacitor varies based on movement of the variable capacitor.

6. A gyroscope circuit, which operates based on an output from a gyroscope element, comprising:
   a gyroscope element that produces an output indicative of movement to be measured;
   at least one amplifier, including transconductance amplifiers, which operates to produce signals indicative of first and second parts of movement from said gyroscope element;
   a summing circuit, summing said first and second parts;
   a differencing circuit, differencing said first and second parts; and
   a detection circuit, producing a movement indicative output based on outputs of both said summing circuit and said differencing circuit.

7. A method of detecting movement, comprising:
   obtaining an output signal from a gyroscope element indicative of movement to be measured said obtaining including using a variable capacitor associated with said gyroscope, such that a voltage on the capacitor is held constant to vary a charge on the capacitor; and
   using both an amplitude and a phase of the output signal to detect the movement.

* * * * *